March 11, 1969 N. BININDA ET AL 3,432,621
TRAFFIC LOAD EQUALIZATION ARRANGEMENT
Filed March 4, 1965
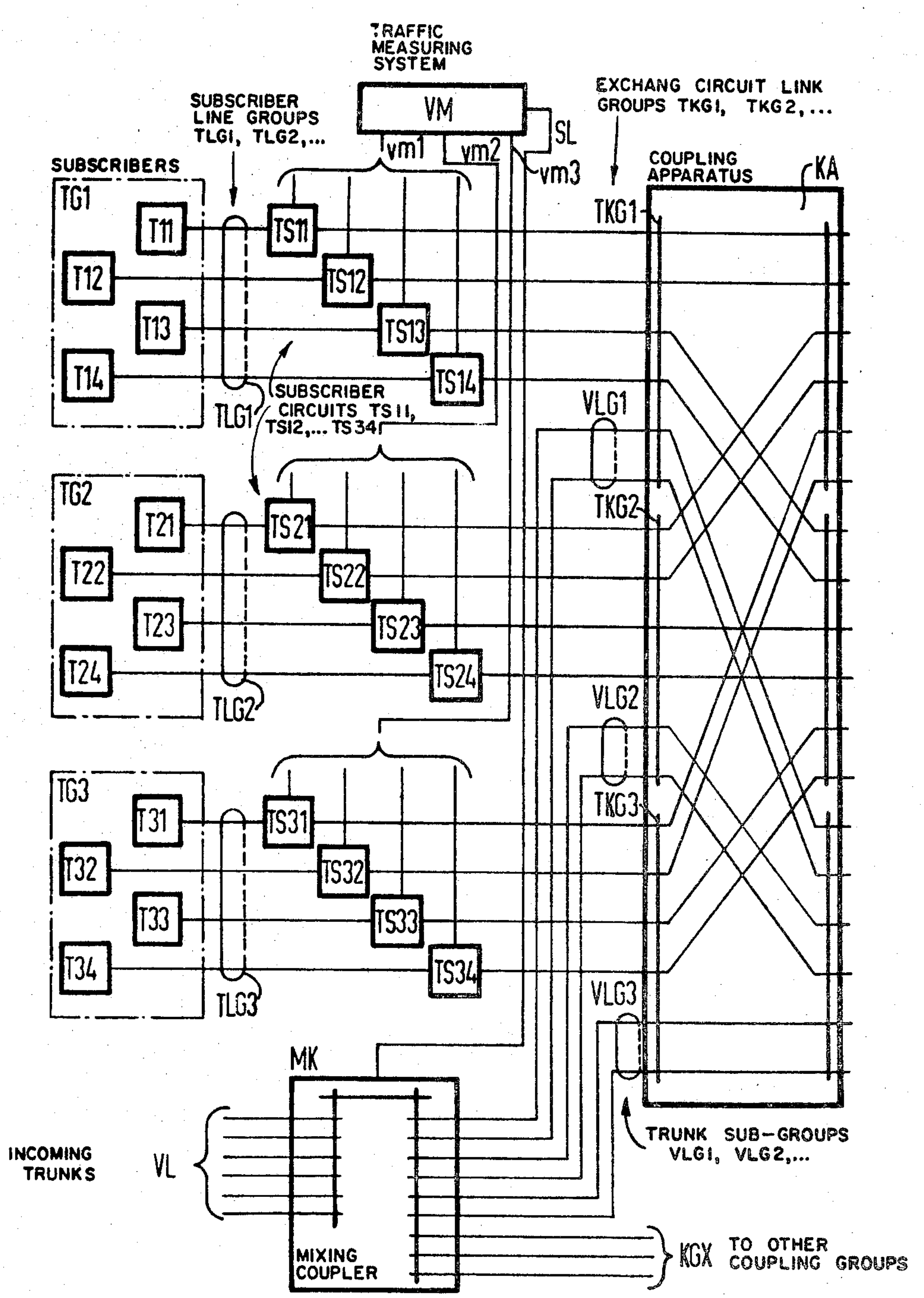

United States Patent Office 3,432,621

Patented Mar. 11, 1969

3,432,621

TRAFFIC LOAD EQUALIZATION ARRANGEMENT

Norbert Bininda, Munich-Solln, Germany, Alfred Wendt, deceased, late of Munich, Germany, by Frau Alfred Wendt, sole heir, Leo-Graetz Strasse 3, Munich, Germany; said Bininda assignor to Siemens Aktiengesellschaft, Munich, Germany Filed Mar. 4, 1965, Ser. No. 479,024

U.S. Cl. 179—18 4 Claims

Int. Cl. H04m 3/00, 7/00; H04q 3/66

ABSTRACT OF THE DISCLOSURE

In a communication exchange installation, traffic equalization for exchange circuit links is provided by detecting traffic load in groups of lines subject to uncontrollable traffic loads and connected to corresponding groups of exchange circuit links and, in response thereto, controlling the traffic load in a group of trunks connected in subgroups to corresponding ones of said groups of exchange circuit links.

This invention concerns a circuit arrangement for long distance communication installations, and in particular for telephone exchange installations, wherein lines subject to uncontrollable traffic loads are connected, in group fashion, to exchange circuit links for the establishment of connections.

As a rule, there exists in telephone exchange installations at any given time, a plurality of connection possibilities for connections such as between two particular subscribers. For example, in plural stage coupling apparatus, several coupling groups are provided in each coupling stage. From each coupling group in each coupling stage there extends to each coupling group of the preceding or succeeding stage, respectively, one or more intermediate lines. As a result, a certain connection can be connected through all the coupling stages over different couplings groups in every, or almost every, coupling stage. If the connection lines of a bundle, or group, of lines are connected to couplers of different coupling groups in, for example, a last coupling stage, a connection which is to be established between two subscribers by way of a line of this bundle can be established over one of the coupling groups to which at least one of the respective lines is connected and which is also free or available.

It is known that in the case of heavy traffic loads on such coupling arrangements, internal blockings appear, through which connections are lost (cannot be completed) even though the called subscriber is free or not busy. It is further known that the traffic performance of such an exchange installation can be improved by equalization of the traffic load in the different coupling groups to the extent possible, in order to keep to a minimum the number of lost connection attempts. In this connection there is already known the approach of varying, under control of a probability generator, the searching sequence by which the intermediate or connection lines leading to different coupling groups are examined and then seized during path searching. Alternatively, it is also known to regulate the searching sequence in dependence on traffic measurements. Both methods may of course be employed to equalize the traffic loads of all coupling groups. Such a control of the seizure of connection lines is possible because, in the seizure operation, usually one of several free lines of equal qualifications can be selected from a group thereof. The mentioned control of the traffic load is directed to this selection.

In addition to connection lines, commonly called trunks, and including such as local connection lines to other central exchanges, long distance lines and the like, subscriber lines may also be connected to an exchange installation, as in the case of a local exchange. In such case it is essential that the telephone connections connect a certain subscriber with another certain subscriber (ignoring collective connections), so that a selection among several free subscriber lines on the basis of traffic measurements is out of the question, and consequently cannot be utilized for the equalization of load among the respective coupling groups.

The object of the present invention is to provide for a degree of equalization of loads, even among the last-mentioned coupling groups. This is accomplished by reason of the fact that, in addition to the subscriber lines, there are also assigned subgroups of a group of lines, or trunks, of controllable traffic loads to corresponding ones of the same groups of exchange circuit links. Consequently, the actual traffic load of the lines subject to uncontrollable traffic loads which are assigned to one group may be measured, and the traffic load of the trunk subgroup subject to controllable traffic load associated with the same line group may be controlled in accordance with such measurement.

An advantage of the invention is the fact that the traffic performance of an exchange installation can be improved, even in the case of exchange circuit links which are provided for the establishment of connections over lines subject to uncontrollable traffic loads.

In the drawing there is shown an operative embodiment of the invention, with only the components absolutely necessary to the understanding thereof.

In the drawing, subscribers T11 to T34 are provided with subscriber lines arranged in groups TLG1 to TLG3, the lines being individually connected to coupling apparatus KA over subscriber circuits TS11 to TS34. In coupling arrangement KA, these subscriber lines are assigned to individual subscriber coupling groups TKG1 to TKG3 over which the connections dialed by the subscribers are completed.

Further connection lines also terminate in the exchange apparatus with which coupling arrangement KA is associated, such lines including a portion provided for incoming traffic and a portion provided for two-way traffic. Of these lines, the connection lines VL such as incoming trunks have access to the subscriber coupling groups TKG1 to TKG3 of the same coupling arrangement KA, through the mixing coupler MK.

The traffic load on subscriber coupling groups TKG1 to TKG3 from the subscribers T11 to T34 is now determined by measurement of the outgoing traffic from subscriber groups TKG1 to TKG3. The traffic loads of these subscriber coupling groups of course will differ considerably from each other according to the kind of subscriber (heavy user, light user, etc.). It is also possible that the traffic loads of the coupling groups be continuously changing in a rhythm depending on the hours of the day (for example, in the case of telephone connections to offices, places of business, theater box offices, doctors, private homes, etc.). In the course of time, changes in the traffic load of course can occur, because the calling needs of a subscriber group may change.

In order to decrease the adverse effects of all of these unpredictable influences which vary the traffic loads both periodically and aperiodically, both in time dependence and independent of time, in addition to the subscriber circuits TS11 to TS34, which are assigned individually to the subscribers and are connected with them over subscriber lines combined in groups TLG1 to TLG3, also a part of the connection lines VL such as incoming trunks suited for incoming traffic have access to the subscriber coupling groups TKG1 to TKG3 over mixing coupler MK. The trunk group connecting the outlets of the mixing coupler MK to the coupler KA is divided into subgroups VLG1, VLG2, VLG3, connected to the corresponding subscriber coupling groups TKG1 to TKG3 and make it possible to bring about equalization of the traffic load among the different subscriber coupling groups.

For this purpose, a traffic measuring device VM is provided and is connected with all subscriber circuits TS11 to TS34 over traffic measuring circuits *vm*1 to *vm*3. The traffic measuring device constantly supervises the circuit conditions of the subscriber circuits with regard to connections in outgoing direction from the subscriber and from this determination ascertains the traffic load which, emanating from, or proceeding to the coupler KA from each of subscriber groups TLG1 to TLG3, has effect on subscriber coupling groups TKG1 to TKG3.

In dependence thereon, the traffic measuring device controls the mixing coupler MK with regard to its searching sequence, over control line SL. Such searching sequence involves the manner in which the mixing coupler searches its outlets to find a free one by which a connection from an incoming trunk line VL can be extended. These outlets are assigned to trunk subgroups VLG1, VLG2, VLG3, the trunk of which in each case leads to a particular subscriber coupling TKG1 to TKG3. Mixing selector MK can thereby be set on any search sequence by the traffic measuring device. The mixing coupler further has access to other coupling groups KGX which are not subscriber coupling groups. Thus it is possible, when a complete balance of the loads of subscriber coupling groups TKG1 to TKG3 is obtained, to set the search sequence for a mixing coupler MK in such a way that it begins each searching process with these lines leading to coupling groups KGX.

The traffic load can also be equalized in another manner than by use of a traffic measuring apparatus, namely by counting the number of lost connection attempts and using such count to control the search sequence of the connecting couplers.

It is further entirely possible to apply the invention described in conjunction with the operative embodiment also in connections to the outlets of the exchange, rather than its inlets. It will further be obvious that other changes may be made in the described operative embodiment without departing from the scope of the invention. Accordingly, the invention is not to be considered limited to the described embodiment, but rather only by the scope of the appended claims.

We claim:

1. The method of traffic equalization for exchange circuit links of communication exchange installations to which lines subject to uncontrollable traffic loads are connected, which includes the steps of
   connecting groups of said lines to corresponding groups of said exchange circuit links and connecting subgroups of trunks of a group subject to controllable traffic loads to corresponding ones of the said groups of exchange circuit links,
   detecting the traffic load in said groups of lines,
   and controlling the traffic loads on said subgroups of trunks in accordance with such detection.

2. The method of claim 1 in which said group of trunks is connected to the outlets of a mixing coupler which operates to search its outlets in response to incoming traffic, and in which the traffic load on said groups of trunks is effected by hunting by said mixing coupler over said outlets thereof.

3. The method of claim 1 in which traffic load detection is performed by counting lost connection attempts caused by internal blocking of the exchange circuit links due to traffic load.

4. The method of claim 1 in which traffic load detection is performed by measuring the traffic load in said groups of lines.

References Cited

UNITED STATES PATENTS

| | | | |
|---|---|---|---|
| 2,774,819 | 12/1956 | Lomax | 178—18 |
| 3,226,488 | 12/1965 | Sikorski et al. | 179—18 |

WILLIAM C. COOPER, *Primary Examiner.*